United States Patent
Muto

[15] 3,634,968
[45] Jan. 18, 1972

[54] WATER TOY
[72] Inventor: Hidehiko Muto, Tokyo, Japan
[73] Assignee: Gakken Co., Ltd., Tokyo, Japan
[22] Filed: Sept. 28, 1970
[21] Appl. No.: 75,806

[30] Foreign Application Priority Data
  Mar. 2, 1970 Japan.................................45/20299

[52] U.S. Cl..............................................46/243 MV, 46/93
[51] Int. Cl.....................................A63h 33/26, A63h 23/00
[58] Field of Search..............................46/91, 92, 93, 243 M

[56] References Cited

UNITED STATES PATENTS

| | | | |
|---|---|---|---|
| 2,909,868 | 10/1959 | Lewis | 46/92 X |
| 3,000,128 | 9/1961 | McAda | 46/92 X |
| 3,043,052 | 7/1962 | Stenzel | 46/243 M |

Primary Examiner—Louis G. Mancene
Assistant Examiner—Robert F. Cutting
Attorney—Irving M. Weiner

[57] ABSTRACT

A water toy including a fish model attached to a boat model by means of an electrical cord having the configuration of a fishing pole and a fishing line. The boat model includes a battery and switch for transmitting electrical energy through the fishing pole and line to a motor disposed within the fish model for rotating a propeller arranged near the tail fine of the fish model. The motion imparted to the fish model by the rotating propeller flexes the fishing rod and line so that it appears that the fish is struggling to get off the fishing line, and at the same time the motion is transmitted to the boat for propelling the boat through the water.

10 Claims, 6 Drawing Figures

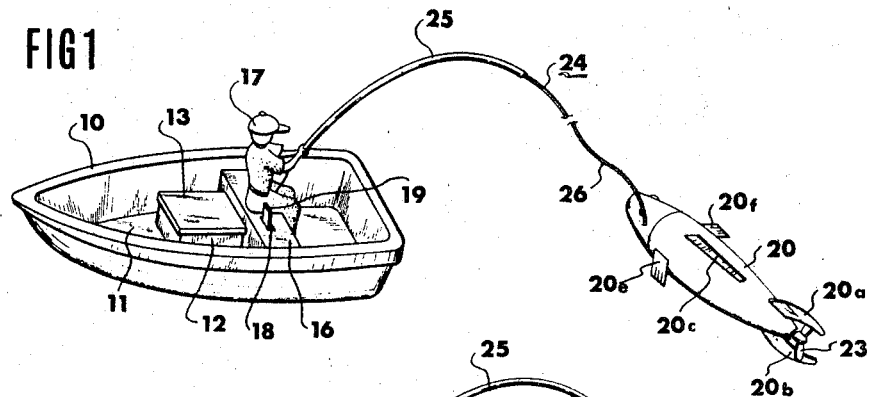
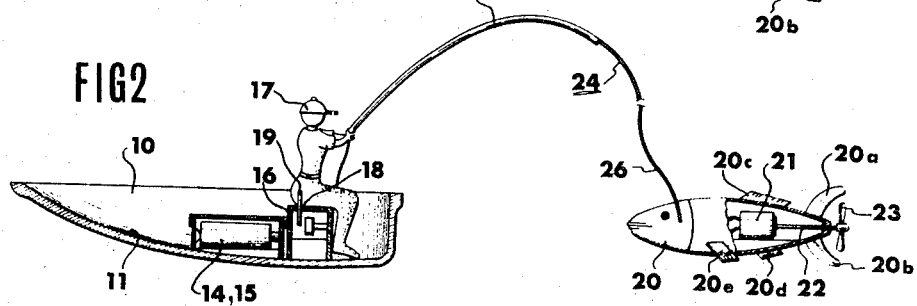
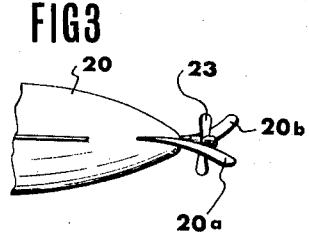
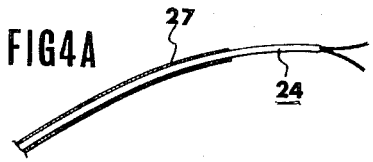
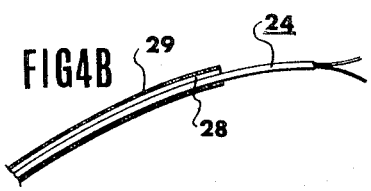
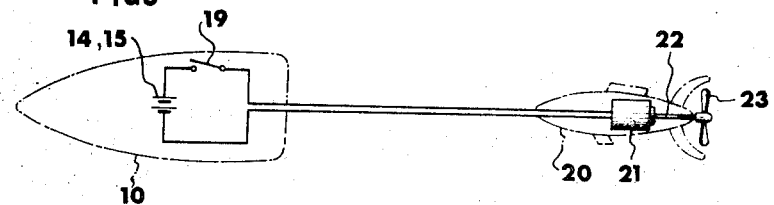
INVENTOR
HIDEHIKO MUTO

WATER TOY

The present invention relates to a toy adapted to float on a liquid. In particular, the invention relates to a water toy which is capable of floating on the water in a bath, pool, pond, stream, etc., and wherein it is possible to control the fishing motion between a fish model and a boat model which are fastened together by means of a fishing line and a fishing rod formed from a flexible electrical cord.

SUMMARY OF THE INVENTION

The present invention provides a toy including a first article, such as a fish model, which is at least partially floatable in a liquid. There is also provided a second article, such as a boat model, which is also at least partially floatable in a liquid. First means disposed within the first article moves the first article relative to the liquid when the first means is energized. Second means disposed within the second article supplies energy to the first means to operate the first means. Third means, which may take the form of a fishing rod and a fishing line, interconnects the first and second articles, interconnects the first and second means, and is so constructed and arranged as to transmit motion from said first article to said second article.

The invention provides a novel water toy which effectively utilizes a simulated fishing action between a fish model and a boat model which are interconnected by a flexible electric cord. A manikin of a fisherman is affixed in the boat model and the manikin is grasping the fishing rod which is formed from said flexible electric cord.

The fish model contains a motor and a propeller which is affixed to the motor shaft. One end of the flexible electric cord is connected to the fish model, and the other end of the electric cord is connected to the boat model. The portion of the flexible electric cord at the end near the boat model is formed in the shape of a fishing rod which is harder than the portion of the electric cord near the fish model which is formed in the shape of a fishing line. Consequently, the fishing line portion is capable of bending more easily than the fishing rod portion.

The boat model does not contain its own motor power system. In the boat model, a fisherman manikin is affixed as if a fisherman is sitting on a stool or seat in the boat. When the fish and the boat are floated on water, the fish is moved by the rotation of the propeller which causes the fish to run about in the water in opposition to the boat model. When energized, it appears as if the fish is caught by the fishing hook which clings to the extreme point of the fishing line, and the fishing line and the fishing rod between the fish and the boat are pulled tightly at times. Accordingly, it looks as if the fish is resisting the tightened fishing line with a struggle.

An object of the invention is to provide a fishing rod and a fishing line which is made of a flexible electric cord connected between the hands of the fisherman manikin on the boat and the operuculum part of the fish model. The flexible electric cord is divided into two portions. One portion takes the form of a fishing rod which is constructed by reinforcing the flexible electric cord near the boat model. The other portion takes the form of a fishing line which is constructed without any reinforcement by the common flexible electric cord adjacent the fish model, which fishing line is able to bend freely in accordance with the propelled motion of the fish. It should be noted that the invention includes the models of the boat and the fish connected by the flexible electric cord as indicated above, and that the boat is driven so as to rush about loudly by the propeller motion of the fish as it will appear more clearly hereinafter.

When the fish model is acted upon by the motor-driven propeller, the fishing line is tightened but is able to bend easily and consequently the fish moves about in the water to the extent which the flexible fishing line and the reinforced part of the flexible cord are able to bend freely. The appearance given is that the fish is swimming and rushing about wildly in the water. Actually, motion is imparted to the boat model by the fish model which is driven by the motor-driven propeller. It appears as if the manikin of the boat is lifting up the big fish, and the conditions between the fish and the boat devote much interest in the observer, especially to children.

Another object of the invention is to provide a water toy of simplified construction wherein the propeller system is disposed only in the fish model. The battery and the power switch are arranged in the boat model, and it is the battery and the power switch in the boat model which provide the motor force to the motor in the fish model through the connection of the flexible electric cord between the fish and boat models. Accordingly, the construction and the electric circuit of the toy are extremely simple with a consequent inexpensive selling price and ease of mass production.

The invention consists of a boat and a fish in which a propeller is driven by a motor. In the boat there is space for fitting the battery and a power switch which is connected in series with the battery and to the flexible cord. The flexible electric cord has a predetermined suitable length. One end of the flexible electric cord is connected to the terminal of the motor in the fish, and the fish is constructed to maintain sealing contact with the plastic fish model such that the contents of the fish model remain waterproof. The output extreme point of the motor shaft in the fish takes the form of a propeller which projects out of the caudal fin portion of the fish model.

When the switch is placed in the on condition for the power source, electric power is fed to the motor circuit through the flexible cord from the battery. The motor in the fish model begins to rotate, thereby driving the propeller fixed to the motor shaft, and the fish model is driven about in the water. The electric flexible cord connected between the boat model and the fish model consists of a fishing rod and a fishing line. The fishing rod is reinforced with a thin metallic wire or metallic tube which is connected to the boat model. Consequently, this portion of the electric cord is hard to bend in comparison with the remainder of the electric cord. The extreme point of the fishing rod is grasped or affixed by the hands of the manikin seated in the boat model, and it appears as if a fisherman is grasping the fishing rod in his hands.

When the boat model is floated on the water with the switch in the off condition, the fish model connected to the boat model through the flexible electric cord sinks lower in the water. However, when the switch in the boat model is put in the off condition, the propeller affixed to the motor shaft begins to rotate and the fish model is driven by this rotation to the extent that the flexible fishing rod and line are capable of bending.

As indicated above, the flexible electric cord consists of a fishing line which is able to bend freely, and a fishing rod which is slightly harder than the fishing line. Accordingly, these parts of the flexible cord are able to bend and move about to accommodate all directions on the water due to the fishing action.

When the fish model is driven by the motor, the fish model swims about in the water and pulls the boat model on the water, and the fishing rod is bent. In addition, the fish model tends to go around the boat model pivoting about the fishing rod. Because of the greater flexibility of the fishing line, the fish model is turned over against the tension of the flexible cord. In addition, the action between the propeller and the water wave results in a variable motion of the fish model, and the boat model is also taken everywhere on the water and moves about so as to resist against the tension of the fishing line. In order to increase or accentuate the struggling motion of the fish model in all directions, the fish model is provided with various fins which are formed so as to twist the fish model as it swims about in its indefinite directions. By the cooperation of the twisting motion, the force of the propeller motion, the tension in the fishing rod portion, and the freely bending capability of the fishing line, the fish model is driven about in indefinite directions with various motions.

BRIEF DESCRIPTION OF THE DRAWINGS

FIG. 1 is a perspective view of a first embodiment of the present invention.

FIG. 2 is a longitudinal side elevational view, partly in section, which illustrates the mechanics of the embodiment illustrated in FIG. 1.

FIG. 3 is an enlarged partial plan view showing the twisted caudal fin of the fish model according to the present invention.

FIG. 4A and FIG. 4B illustrate sectional views of different modifications of the reinforced flexible electric cord.

FIG. 5 is a sketch of the electrical circuit of the present invention.

DETAILED DESCRIPTION OF SOME PREFERRED EMBODIMENTS OF THE PRESENT INVENTION

With reference to FIGS. 1 and 2, the first embodiment of the present invention may include the first article, such as a fish model 20, which is at least partially floatable in a liquid. There is also included a second article, such as a boat model 10, which is at least partially floatable in a liquid. The first means, including the motor 21, a motor shaft 22 and a propeller 23, is disposed within the fish model 20 for moving the fish model 20 relative to the liquid when the first means is energized. The second means, such as a battery 14, 15 and a switch 19, are disposed within the boat model 10 for supplying energy to the motor 21 to operate the motor 21. The third means, such as a flexible electric cord 24, interconnects the fish model 20 and the boat model 10.

The boat model 10 may be constructed of any suitable material, such as a plastic material, and may be fabricated by the setup or casting process. The boat model 10 need not contain its own motive for driving system. The boat model 10 includes a bottom 11 to which is affixed a container box 12 for accommodating or housing the battery 14, 15. In the interior of the container box 12, the two terminals of the battery 14, 15 are connected to the flexible electric cord 24. The battery 14, 15 is protected by a cover 13 which is maintained in sealing contact on the container box 12. When it becomes necessary to change the battery 14, 15 for a new one, cover 13 is easily taken apart.

A stool 16 is affixed to the back of the container box 12 in the boat model 10. The stool 16 is disposed at the proper seat height, and may extend across the entire width of the boat model 10.

The manikin 17, which may be formed of plastic material, is affixed on the stool 16 in the boat model 10 as if a fisherman is sitting down on the stool 16. The hands of the manikin 17 are separately vertically from each other, and the lower part of a fishing rod 25 is grasped by the bending tip of the fingers of the manikin 17. An elongated hole 18 is bored at one side of the stool 16. A switch push rod 19 for actuating switch projects out of the interior of stool 16 through the elongated hole 18 at the side of the stool 16. The switch acted upon by the push rod 19 is connected to the battery circuit and completes a series circuit through the battery 14, 15 located in the boat model 10 for placing the motor 21 in the fish model 20 in an on or off condition.

The fish model 20 is fabricated cubically out of plastic material in the shape of an actual or genuine fish. The fish model 20 is constructed so as to maintain a sealing or waterproof contact, and the interior of the plastic fish model 20 is essentially empty space. The motor 21 is disposed in this space. The extreme point of a motor shaft 22 projects out of the caudal fin 20A and 20B of the plastic fish model 20. At this extreme output point of the motor shaft 22 there is affixed a propeller 23 for driving the fish model 20.

The waterproof and flexible electric cord 24 is connected to the battery circuit through the switch and is also connected to each of the motor terminals. It is preferable to use a thin flexible and waterproof plastic covered cord for the electric cord 24. The circuit which contains the battery 14, 15 the switch 19 and the motor 21 is formed by using this flexible electric cord.

When the switch 19 on the boat model 10 is in the on condition, the motor 21 begins to rotate and at the same time the screw propeller 23 which is affixed to the extreme point of the motor shaft 22 also begins to rotate. The flexible electric cord 24 is led to the interior of the fish model 20 through the nostril or the operculum portion of the fish. The part of the electric cord 24 in the shape of the fishing rod 25 is hard to bend in comparison with another part 26 of the flexible electric cord 26. The extreme lower point of the fishing rod 25 is affixed between the bending fingers of the manikin 17 so it looks as if the fisherman is grasping the fishing rod 25 with his hands.

The fish model 20 has two caudal fins 20A and 20B at the upper and lower portions of the caudal appendage, respectively, a dorsal fin 20C at the back of it, an anal fin 20D at the part of the anus, and two pectoral fins 20E and 20F which are spread downwardly from each other at both sides of the chest of the fish. Each of the aforementioned fins are formed so as to work as a rudder when the fish is moving. This is especially true of the caudal fin 20A and the lower caudal fin 20B which are spread upwardly and downwardly from each other and are twisted in opposite directions respectively as illustrated in FIG. 3. When the fish model 20 is moved by the screw propeller 23 in the water, the upper caudal fin 20A and the lower caudal fin 20B act as rudders. This results in the fish model 20 being driven in various directions and swims about to the flexible extent that the fishing rod can reach. The reinforced fishing rod 25 acts to pull the fish model 20 so that the fish model 20 does not go outside of the aforementioned extent in the water. At times the fishing rod 25 is bent like a bow, and consequently the moving action of the fish model 20 is controlled in a predetermined finite area.

In addition, the portion of the flexible electric cord 24 at the side of the boat model is reinforced in a suitable length at the portion where the fishing rod 25 is formed. However, another portion 26 of the flexible electric cord 24 near the fish model 20 is not reinforced. This portion is formed as the fishing line 26, and the fishing line 26 is capable of bending freely in response to the motion of the fish model 20.

To form the fishing rod 25, the flexible electric cord 24 at the side of the boat model 10 may be covered with a hard tube 27 which is not capable of bending freely and easily as illustrated in FIG. 4A. Alternatively, a suitably long wire 28 may be held along the part of the flexible fishing rod 24, and then covered with a waterproof insulating tape 29 which is rolled over the wire and the flexible card 24, as illustrated in FIG. 4B. Consequently, the wire or the tube and the part flexible electric cord 24 are formed as an integral body of the fishing rod 25.

I claim:

1. A toy comprising, in combination:
   a first article which is at least partially floatable in a liquid;
   a second article which is at least partially floatable in a liquid;
   first means disposed within said first article for moving said first article relative to said liquid when said first means is energized;
   second means disposed within said second article for supplying energy to said first means to operate said first means; and
   third means interconnecting said first and second articles, interconnecting said first and second means, and being so constructed and arranged as to transmit motion from said first article to said second article.

2. A toy characterized substantially in accordance with claim 1, wherein said first means includes a motor, a rotatable motor shaft, and a propeller affixed to said motor shaft; and said second means includes a source of electrical energy and a switch for selectively applying said electrical energy through said third means to said motor.

3. A toy characterized substantially in accordance with claim 1, wherein said first article includes a fish model.

4. A toy characterized substantially in accordance with claim 1, wherein said second article includes a boat model.

5. A toy characterized substantially in accordance with claim 1, wherein:
   said first article includes a fish model;
   said second article includes a boat model;
   said first means including a motor, a motor shaft, and a propeller affixed to said motor shaft such that said propeller projects out of the caudal portion of said fish model;
   said second means including a switch and an electrical battery which is connected to said motor; and
   said third means is formed in the shape of a fishing rod and a fishing line including a flexible electrical cord which is electrically connected between said motor and said battery through said switch.

6. A toy characterized substantially in accordance with claim 5, including a manikin affixed in said boat model, and wherein the part of said flexible electrical cord at the side of the boat model is reinforced and forms said fishing rod, said fishing rod being grasped by said manikin on said boat model, and the part of said flexible electric cord near said fish model is bent freely and forms said fishing line.

7. A toy characterized substantially in accordance with claim 5, wherein said fish model is provided with fins which act as a rudder.

8. A toy characterized substantially in accordance with claim 6, wherein said fishing rod is covered with a tube which is substantially hard as compared with said fishing line.

9. A toy characterized substantially in accordance with claim 6, wherein said reinforced fishing rod includes a hard wire which is made integral with said portion of said flexible electrical cord by rolling waterproof material over said hard wire and said portion of said flexible electric cord.

10. A toy characterized substantially in accordance with claim 7, wherein said fins include an upper caudal fin and a lower caudal fin which are twisted in opposite directions to each other adjacent the caudal portion of said fish model.

* * * * *